United States Patent
Yura et al.

(10) Patent No.: US 8,303,927 B2
(45) Date of Patent: Nov. 6, 2012

(54) METHODS FOR MANUFACTURING SPINEL-TYPE LITHIUM MANGANESE AND CATHODE ACTIVE MATERIAL FOR LITHIUM SECONDARY BATTERY

(75) Inventors: Yukinobu Yura, Nagoya (JP); Nobuyuki Kobayashi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 136 days.

(21) Appl. No.: 12/791,161

(22) Filed: Jun. 1, 2010

(65) Prior Publication Data

US 2010/0327220 A1 Dec. 30, 2010

(30) Foreign Application Priority Data

Jun. 25, 2009 (JP) ................. 2009-150415

(51) Int. Cl.
- *C01G 45/12* (2006.01)
- *C01G 29/00* (2006.01)
- *C01G 30/00* (2006.01)
- *H01M 4/13* (2010.01)
- *H01M 4/50* (2010.01)
- *H01M 4/88* (2006.01)

(52) U.S. Cl. ............... 423/599; 423/594.7; 423/594.15; 429/224; 252/182.1

(58) Field of Classification Search .............. 423/599, 423/594.7, 594.15; 429/224; 252/182.1
See application file for complete search history.

(56) References Cited

U.S. PATENT DOCUMENTS

| | | | |
|---|---|---|---|
| 6,413,673 B1* | 7/2002 | Kasai et al. | 429/231.95 |
| 6,489,060 B1* | 12/2002 | Zhang et al. | 429/224 |
| 6,576,215 B1 | 6/2003 | Numata et al. | |
| 6,699,618 B2 | 3/2004 | Noda et al. | |
| 6,890,456 B2 | 5/2005 | Noda et al. | |
| 7,090,822 B2* | 8/2006 | Noda et al. | 423/594.15 |
| 7,534,381 B2* | 5/2009 | Haldar et al. | 264/120 |
| 2004/0072071 A1* | 4/2004 | Watanabe et al. | 429/223 |
| 2005/0175899 A1* | 8/2005 | Noda et al. | 429/231.1 |
| 2007/0145815 A1* | 6/2007 | Swanson | 301/124.1 |

FOREIGN PATENT DOCUMENTS

| | | |
|---|---|---|
| EP | 1 094 034 | 4/2001 |
| JP | 2000-030707 | 1/2000 |
| JP | 2000-294239 | 10/2000 |
| JP | 2001-273900 | 10/2001 |
| JP | 2002-167220 | 6/2002 |
| JP | 2003-183022 | 7/2003 |
| JP | 2004-152777 | 5/2004 |

(Continued)

OTHER PUBLICATIONS

Tan et al., "Performance improvement of LiMn2O4 as cathode material for lithium ion battery with bismuth modification", Journal of Power Sources 184 (2008) 408-413.*

*Primary Examiner* — Stanley Silverman
*Assistant Examiner* — Anthony J Zimmer
(74) *Attorney, Agent, or Firm* — Burr & Brown

(57) ABSTRACT

A manufacturing method of the present invention includes (a) a material preparation step of preparing a material containing lithium, manganese, and bismuth, and (b) a firing step of firing the material prepared by the material preparation step at a temperature of 830° C. to 1,000° C. In the material preparation step, the material is prepared such that the residual amount of bismuth in spinel-type lithium manganate yielded by the firing step is 0.01 mol % or less with respect to manganese.

4 Claims, 3 Drawing Sheets

FOREIGN PATENT DOCUMENTS

| | | |
|---|---|---|
| JP | 2004-199909 | 7/2004 |
| JP | 2004-259700 | 9/2004 |
| JP | 2005-038629 | 2/2005 |
| JP | 2005-347134 | 12/2005 |
| JP | 2008-063213 | 3/2008 |
| WO | 00/61495 | 10/2000 |
| WO | 01/04975 A1 | 1/2001 |

* cited by examiner

US 8,303,927 B2

METHODS FOR MANUFACTURING SPINEL-TYPE LITHIUM MANGANESE AND CATHODE ACTIVE MATERIAL FOR LITHIUM SECONDARY BATTERY

FIELD OF THE INVENTION

The present invention relates to a method for manufacturing spinel-type lithium manganate and a method for manufacturing a cathode active material for a lithium secondary battery formed of spinel-type lithium manganate.

BACKGROUND OF THE INVENTION

Lithium manganate having a spinel structure is known as a cathode active material for a lithium secondary battery (may be referred to as a lithium ion secondary battery) (refer to, for example, Japanese Patent Application Laid-Open (kokai) No. 2000-30707).

In contrast to cathode active materials formed from a cobalt-based oxide or a nickel-based oxide, a cathode active material of lithium manganate has the following features: high safety, high rate property, and low cost. However, the cathode active material of lithium manganate faces a challenge in durability at high temperature, such as deterioration in cycle property at high temperature and deterioration in storage property at high temperature.

Increasing grain size (to, for example, 10 μm or more) is effective in solving the above-mentioned problem of the cathode active material of spinel-type lithium manganate.

Generally, growing grains at high temperature in excess of 1,000° C. yields grains having a grain size of 10 μm or greater. At this time, spinel-type lithium manganate is decomposed into lithium manganate having a layered rock salt structure, and manganese oxide. During temperature fall, the decomposed substances absorb oxygen and are restored to spinel-type lithium manganate. However, grains which have undergone such a process have many oxygen deficiencies, resulting in deterioration in characteristics.

Thus, a conventional method has failed to industrially manufacture a cathode active material of spinel-type lithium manganate having a large grain size and exhibiting enhanced characteristics (i.e., few impurities and defects).

SUMMARY OF THE INVENTION

A manufacturing method of the present invention comprises (a) a material preparation step of preparing a material containing lithium, manganese, and bismuth, and (b) a firing step of firing the material prepared by the material preparation step at a temperature of 830° C. to 1,000° C. Prior to the firing step, (c) a sheet formation step can be performed for forming the prepared material into a sheet.

For example, in the material preparation step, a mixed powder which contains a lithium compound, a manganese compound, and a bismuth compound (e.g., $Bi_2O_3$) is prepared. At this time, a compound of bismuth and manganese (e.g., $Bi_2Mn_4O_{10}$) may be used as the manganese compound and the bismuth compound. Also, for example, the material preparation step may be such that a bismuth compound is added to lithium manganate.

Preferably, the firing step is performed under the condition that transpiration of bismuth is accelerated.

In the case of firing of a powdery material, it may be good practice to establish good contact between the powder and the atmosphere in the course of firing. Specifically, for example, a deposition height in a crucible or sheath can be set in such a manner as to increase the area of contact with the atmosphere (e.g., 20 mm or less). Alternatively, an air current can be formed within a furnace by means of introduction of air or the like. Alternatively, firing can be performed while stirring a powder by use of a rotary kiln or the like. Notably, a sintered body (in the form of plates or spheres) of a material (e.g., zirconia) which serves as a getter and absorbs bismuth may be disposed appropriately in the powder.

When sheets formed by the sheet formation step are to be fired, preferably, in order to reduce the overlapping of sheets, the sheets are placed individually on setters for firing. Alternatively, preferably, the sheets are crumpled and placed in an uncovered sheath, followed by firing.

The sheet formation step can employ a tape formation method, such as an ordinary doctor blading process. Alternatively, a drum drier can be used; specifically, a slurry which contains material is applied onto a heated drum for drying, followed by scraping off of the dried material by use of a scraper. Alternatively, a disk drier can be used; specifically, the slurry is applied onto a heated disk surface for drying, followed by scraping off of the dried material by use of a scraper. Also, hollow granules yielded by appropriately setting the conditions of a spray drier can be considered sheet-like granules having curvature and thus can be used preferably.

The present invention is characterized in that, in the material preparation step, the material is prepared such that the residual amount of bismuth in spinel-type lithium manganate (cathode active material) yielded by the firing step is 0.01 mol % or less with respect to manganese. Specifically, for example, in the material preparation step, the material is prepared such that the material contains bismuth in an amount of 0.005 mol % to 2 mol % with respect to manganese.

In solid-phase synthesis of spinel-type lithium manganate, through addition of the bismuth compound into the material, grain growth is accelerated. Thus, highly crystalline grains having a large grain size are yielded through low-temperature firing.

Meanwhile, bismuth is likely to produce a compound with manganese contained in spinel. Thus, when the residual amount of bismuth in a material yielded through firing is large, $Bi_2Mn_4O_{10}$ is formed in the material. Intercalation and deintercalation of lithium (ions) do not occur in $Bi_2Mn_4O_{10}$. Therefore, the formation of $Bi_2Mn_4O_{10}$ through firing causes deterioration in characteristics of yielded lithium manganate (reduction in discharge capacity per unit weight of cathode active material).

Specifically, when the residual amount of bismuth is large, the filling rate of a cathode substantially drops by an extent corresponding to the weight of residual bismuth and an extent corresponding to the weight of manganese which reacted with bismuth and fails to become spinel. Further, the Li/Mn ratio of spinel-type lithium manganate shifts toward an Li rich side, resulting in a drop in the theoretical capacity of a cathode active material of lithium manganate. Therefore, when the residual amount of bismuth is large, the discharge capacity reduces greatly.

By contrast, according to the manufacturing method of the present invention, by virtue of transpiration of a bismuth compound (bismuth oxide) in the course of the firing step, the residual amount of bismuth in spinet-type lithium manganate (the aforementioned cathode active material) yielded by the firing step is zero or very small (the residual amount of bismuth is 0.01 mol % or less with respect to manganese).

In the case where a sheet formed by the sheet formation step is fired, grains can grow two-dimensionally. Therefore, grain growth is favorably accelerated.

Therefore, according to the present invention, lithium manganate (the aforementioned cathode active material) having a large grain size and enhanced characteristics can be industrially manufactured.

DETAILED DESCRIPTION OF THE INVENTION

A preferred embodiment of the present invention will next be described by use of examples and comparative examples. The following description of the embodiment is nothing more than the specific description of a mere example embodiment of the present invention to the possible extent in order to fulfill description requirements (descriptive requirements and enabling requirements) of specifications required by law.

Thus, as will be described later, naturally, the present invention is not limited to the specific configurations of the embodiment and examples to be described below. Exemplary modifications that can be made to the embodiment and examples are collectively described herein at the end, since insertion thereof into the description of the embodiment would disturb understanding of consistent description of the embodiment.

1. Configuration of Lithium Secondary Battery

Figure 1:
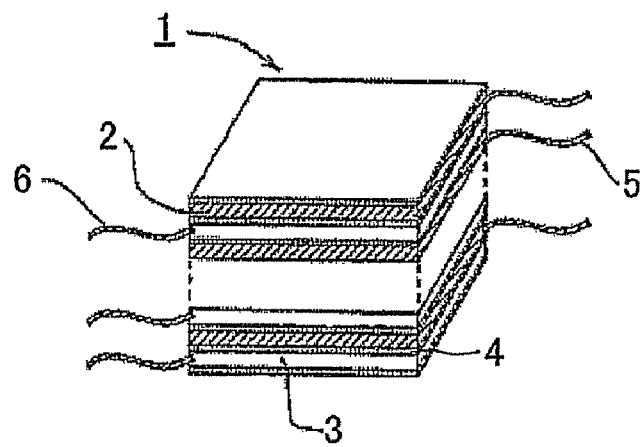
FIG. 1 is a sectional view showing the schematic configuration of an example lithium secondary battery to which an embodiment of the present invention is applied.

FIG. 1 is a sectional view showing the schematic configuration of an example lithium secondary battery 1 to which an embodiment of the present invention is applied. Referring to FIG. 1, the lithium secondary battery 1 is a so-called liquid-type battery and includes cathode plates 2, anode plates 3, separators 4, cathode tabs 5, and anode tabs 6.

The separator 4 intervenes between the cathode plate 2 and the anode plate 3. That is, the cathode plate 2, the separator 4, and the anode plate 3 are stacked in this order. The cathode tabs 5 are electrically connected to the respective cathode plates 2. Similarly, the anode tabs 6 are electrically connected to the respective anode plates 3.

The lithium secondary battery 1 shown in FIG. 1 is configured such that a stack of the cathode plates 2, the separators 4, and the anode plates 3, and an electrolytic solution which contains a lithium compound as electrolyte are liquid-tightly sealed in a predetermined battery casing (not shown).

Figure 2:
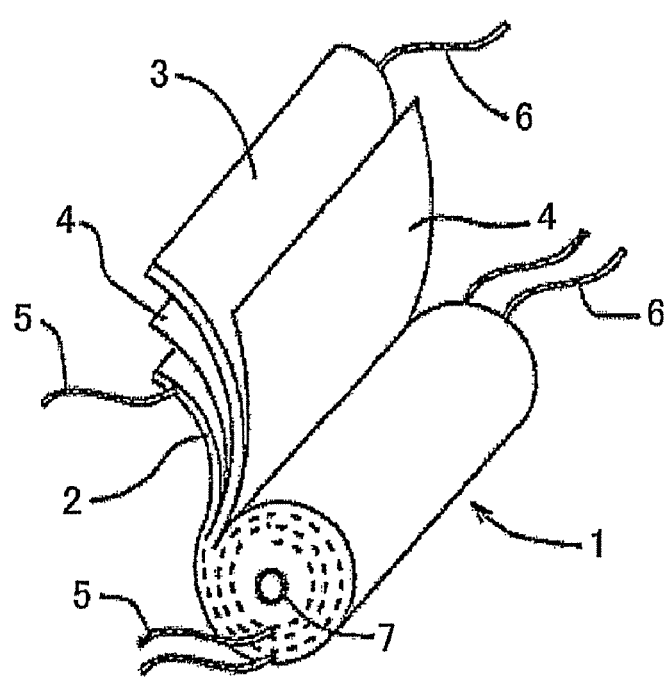
FIG. 2 is a perspective view showing the schematic configuration of another example lithium secondary battery to which the embodiment of the present invention is applied.

FIG. 2 is a perspective view showing the schematic configuration of another example lithium secondary battery 1 to which the embodiment of the present invention is applied. Referring to FIG. 1, this lithium secondary battery 1 is also a liquid-type battery and includes the cathode plate 2, the anode plate 3, the separators 4, the cathode tabs 5, the anode tabs 6, and a core 7.

The lithium secondary battery 1' shown in FIG. 2 is configured such that an internal electrode body formed through winding, onto the core 7, of a stack of the cathode plate 2, the separators 4, and the anode plate 3, and the above-mentioned electrolytic solution are liquid-tightly sealed in a predetermined battery casing (not shown).

Figure 3:
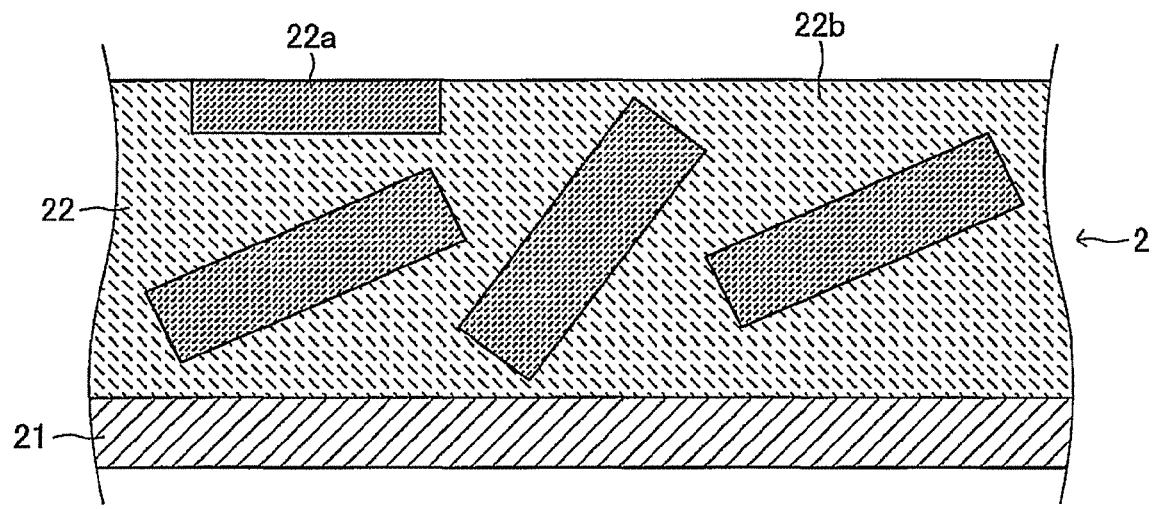
FIG. 3 is an enlarged sectional view of a cathode plate shown in FIGS. 1 and 2.

FIG. 3 is an enlarged sectional view of the cathode plate 2 shown in FIGS. 1 and 2. Referring to FIG. 3, the cathode plate 2 includes a cathode current collector 21 and a cathode layer 22. The cathode layer 22 is configured such that cathode active material particles 22a are dispersed in a binder 22b. The cathode active material particles 22a are plate-like secondary particles which contain crystal grains of spinel-type lithium manganate having a large grain size (specifically, a maximum diameter of 10 μm or more).

2. Method for Manufacturing Cathode Active Material Particles

The cathode active material particles 22a shown in FIG. 3 are manufactured by a manufacturing method including the following four steps: (1) material preparation step; (2) firing step; (3) milling and classification step; and (4) reheating step.

(1) Material preparation step: a mixed powder of compounds which contain lithium, manganese, and bismuth is prepared. Specifically, a mixed powder which contains a lithium compound, a manganese compound, and a bismuth compound is prepared.

(2) Firing step: The mixed powder prepared in the above-mentioned material preparation step is fired at a temperature of 830° C. to 1,000° C., thereby yielding spinel-type lithium manganate (cathode active material).

(3) Milling and classification step: Spinel-type lithium manganate (cathode active material) yielded by the above-mentioned firing step is subjected to a wet or dry milling step and/or a classification step, thereby yielding a powder of spinel-type lithium manganate (cathode active material) particles having a required size.

(4) Reheating step: The powder yielded by the above-mentioned milling and classification step is thermally treated at a temperature lower than the firing temperature in the above-mentioned firing step, thereby yielding cathode active material particles 22a. This reheating step is performed for repairing oxygen deficiencies.

In the present embodiment, the above-mentioned material preparation step is performed such that the residual amount of bismuth in the yielded cathode active material particles 22a of spinel-type lithium manganate is 0.01 mol % or less with respect to manganese. Specifically, in the material preparation step, a lithium compound, a manganese compound, and a bismuth compound are weighed and mixed together such that the prepared mixed powder contains bismuth in an amount of 0.005 mol % to 2 mol % with respect to manganese.

Specific examples of the above-mentioned manufacturing method and the results of evaluation of particles manufactured by the manufacturing methods of the specific examples will next be described in detail.

EXAMPLE 1

2-1-1. Manufacturing Method (1) The material preparation step was performed as described below in pars. (1-1) to (1-4).

(1-1) $Li_2CO_3$ powder (product of The Honjo Chemical Corporation, fine grade, average particle size 3 μm) and $MnO_2$ powder (product of Tosoh Corporation, electrolytic manganese dioxide, average particle size 0.2 μm, purity 95%) were weighed in such a manner as to establish the compositional proportions of $Li_{1.1}Mn_{1.9}O_4$. Further, a $Bi_2O_3$ powder (product of Taiyo Koko Co., Ltd., particle size 0.3 μm) was weighed such that the ratio of Bi to Mn contained in the $MnO_2$ material was a predetermined value (which will be described later).

(1-2) 100 parts by weight of the materials weighed in par. (1-1) and 300 parts by weight of ion-exchanged water, which serves as dispersant, were placed in a cylindrical wide-mouthed bottle of a synthetic resin and subjected to wet-mixing and wet-milling for 16 hours by use of a ball mill (zirconia balls having a diameter of 5 mm).

(1-3) The yielded slurry was dried by use of a spray drier. Operating conditions were as follows: a hot air inlet temperature of 300° C. to 310° C. and an air outlet temperature of 110° C. to 150° C.

(2) Firing step: The dried powder yielded by the above-mentioned material preparation step was spread in an amount of 5 g in a sheath (dimensions: 90 mm×90 mm×60 mm high) of alumina, followed by firing (thermal treatment) in an uncovered condition (i.e., in the air) at a predetermined temperature (which will be described later) for 24 hours.

(3) Milling and classification step: The fired (thermally treated) powder was caused to pass through a polyester mesh having an average opening diameter of 100 μm. Subsequently, 100 parts by weight of the yielded powder, 300 parts by weight of ion-exchanged water, which serves as dispersant, and zirconia balls having a diameter of 5 mm were placed in a cylindrical wide-mouthed bottle of a synthetic resin and subjected to wet-milling for one hour by use of a ball mill. The yielded slurry was dried by use of a hot-air drier (80° C.).

(4) Reheating step: Particles yielded by the above-mentioned milling and classification step were thermally treated at 650° C. in the atmosphere for 24 hours, thereby yielding plate-like secondary particles of spinel-type lithium manganate which contain crystal grains having a maximum diameter of 10 μm or more (the grain size can be confirmed through observation of grains by use of a scanning electron microscope).

2-1-2. Evaluation Method (A) Residual Amount of Bismuth The residual amount of bismuth was measured by use of an ICP (inductively coupled plasma) emission spectrophotometer. Specifically, HCl was added to the yielded lithium manganate powder. The resultant mixture was subjected to pressure decomposition, thereby preparing a solution sample. The solution sample was loaded into an analyzer (ULTIMA2, product of HORIBA Ltd.) for performing quantitative analysis of Li, Mn, and Bi. On the basis of the results of the quantitative analysis, the mol ratio (%) of Bi to Mn in lithium manganate spinel was calculated.

(B) Battery Property (Capacity Maintenance Ratio)

Figure 4:
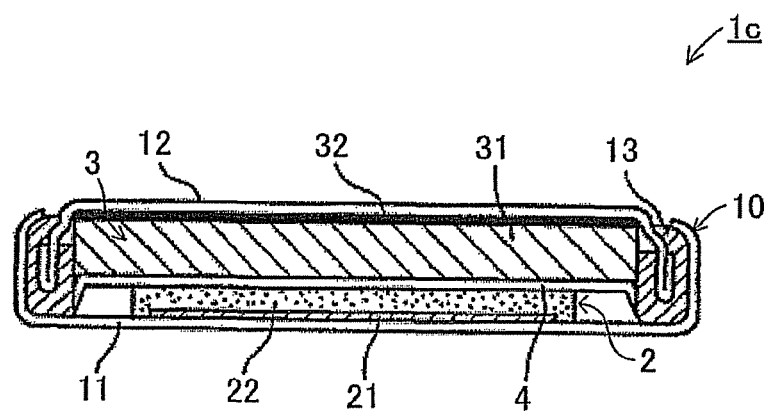
FIG. 4 is a side sectional view showing the schematic configuration of a coin cell for evaluating spinel-type lithium manganate particles (cathode active material particles shown in FIG. 3) manufactured by one embodiment of the manufacturing method according to the present invention.

FIG. 4 is a side sectional view showing the schematic configuration of a coin cell 1c for evaluating spinel-type lithium manganate particles (cathode active material particles 22a shown in FIG. 3) manufactured by one embodiment of the manufacturing method according to the present invention.

The configuration of the coin cell 1c for evaluation use shown in FIG. 4 is next described. The coin cell 1c was fabricated as follows. A cathode current collector 21, a cathode layer 22, a separator 4, an anode layer 31, and an anode current collector 32 were stacked in this order. The resultant stack and an electrolyte were liquid-tightly sealed in a battery casing 10 (including a cathode container 11, an anode container 12, and an insulation gasket 13).

Specifically, spinel-type lithium manganate particles yielded by the above-mentioned manufacturing method, acetylene black which serves as an electrically conductive agent, and polyvinylidene fluoride (PVDF) which serves as a binder were mixed at a mass ratio of 75:20:5, thereby preparing a cathode material. 0.02 g of the prepared cathode material was press-formed to a disk having a diameter of 20 mm under a pressure of 300 $kg/cm^2$, thereby fabricating the cathode layer 22.

The coin cell 1c was fabricated by use of the fabricated cathode layer 22; an electrolytic solution; the anode layer 31 formed from a lithium metal plate; the anode current collector 32 formed from stainless steel plate; and the separator 4 formed from a lithium ion permeable polyethylene film. The electrolytic solution was prepared as follows: ethylene carbonate (EC) and diethyl carbonate (DEC) were mixed at equal volume ratio so as to prepare an organic solvent, and $LiPF_6$ was dissolved in the organic solvent at a concentration of 1 mol/L.

The coin cell shown in FIG. 4 was fabricated and subjected to cyclic charge-discharge which repeated, at a test temperature of 45° C., (1) charge at a 1 C rate of constant current and constant voltage until 4.2 V is reached, and (2) discharge at a 1 C rate of constant current until 3.0 V is reached. The capacity maintenance ratio (%) was defined as a value obtained by dividing the discharge capacity of a cell as measured after 100 repetitions of cyclic charge-discharge by the initial discharge capacity of the cell.

2-1-3. Results of Evaluation

Table 1 shows the results of experiments in which the firing temperature was changed at an amount of addition of bismuth of 0.2 mol % in the above-mentioned par. (1-1). Table 2 shows the results of experiments which were conducted under the same firing temperature conditions as those of Table 1 at an amount of addition of bismuth of 0.

TABLE 1

|  | Added amount of Bi [mol %] | Firing temp. [° C.] | Residual amount of Bi [mol %] | Capacity maintenance ratio [%] |
|---|---|---|---|---|
| Comparative Example 1 | 0.2 | 800 | 0.15 | 85 |
| Experimental Example 1 | 0.2 | 830 | less than 0.01 | 91 |
| Experimental Example 2 | 0.2 | 900 | less than 0.01 | 93 |
| Experimental Example 3 | 0.2 | 950 | less than 0.01 | 92 |
| Experimental Example 4 | 0.2 | 1,000 | less than 0.01 | 90 |
| Comparative Example 2 | 0.2 | 1,050 | less than 0.01 | 86 |

TABLE 2

|  | Added amount of Bi [mol %] | Firing temp. [° C.] | Residual amount of Bi [mol %] | Capacity maintenance ratio [%] |
| --- | --- | --- | --- | --- |
| Comparative Example 3 | 0 | 800 | — | 82 |
| Comparative Example 4 | 0 | 830 | — | 85 |
| Comparative Example 5 | 0 | 900 | — | 85 |
| Comparative Example 6 | 0 | 950 | — | 83 |
| Comparative Example 7 | 0 | 1,000 | — | 82 |
| Comparative Example 8 | 0 | 1,050 | — | 77 |

As shown in Table 1, the capacity maintenance ratio was good (90% or higher) in a firing temperature range of 830° C. to 1,000° C. At this time, the residual amount of bismuth was less than 0.01 mol % with respect to manganese. As is apparent from comparison of the results between Table 1 and Table 2, the addition of bismuth brought about characteristic enhancement.

Next, Table 3 shows the results of experiments in which the amount of addition of bismuth was changed at a constant firing temperature (900° C.).

TABLE 3

|  | Added amount of Bi [mol %] | Firing temp. [° C.] | Residual amount of Bi [mol %] | Capacity maintenance ratio [%] |
| --- | --- | --- | --- | --- |
| Comparative Example 9 | 0.001 | 900 | less than 0.01 | 86 |
| Experimental Example 5 | 0.005 | 900 | less than 0.01 | 93 |
| Experimental Example 6 | 0.02 | 900 | less than 0.01 | 93 |
| Experimental Example 7 | 2 | 900 | 0.01 | 92 |
| Comparative Example 10 | 5 | 900 | 0.2 | 91 |

As shown in Table 3, when the amount of addition of bismuth was in a range of 0.05 mol % to 2 mol % with respect to manganese, the residual amount of bismuth was 0.01 mol % or less with respect to manganese, and the capacity maintenance ratio was good (90% or higher).

EXAMPLE 2

2-2-1. Manufacturing Method (1) Material preparation step: $Li_2CO_3$ powder (product of The Honjo Chemical Corporation, fine grade, average particle size 3 μm) and $MnO_2$ powder (product of Tosoh Corporation, electrolytic manganese dioxide, FM grade, average particle size 5 μm, purity 95%) were weighed in such a manner as to establish the compositional proportions of $Li_{1.1}Mn_{1.9}O_4$. Further, a $Bi_2O_3$ powder (product of Taiyo Koko Co., Ltd., particle size 0.3 μm) was weighed such that the ratio of Bi to Mn contained in the $MnO_2$ material was 1 mol %. 100 parts by weight of the materials weighed and 100 parts by weight of an organic solvent (equal volume mixture of toluene and isopropanol), which served as dispersant, were placed in a cylindrical wide-mouthed bottle of a synthetic resin and subjected to wet-mixing and wet-milling for 16 hours by use of a ball mill (zirconia balls having a diameter of 5 mm).

(2) Sheet formation step: To the material which had undergone wet-mixing and wet-milling, 10 parts by mass of polyvinyl butyral (trade name "S-LEC BM-2," product of Sekisui Chemical Co., Ltd.), which served as binder, 4 parts by mass of plasticizer (trade name "DOP," product of Kurogane Kasei Co., Ltd.), and 2 parts by mass of dispersant (trade name "RHEODOL SP-O30," product of Kao Corporation) were added, followed by mixing for yielding a slurry material for formation. The slurry material for formation was stirred under reduced pressure for defoaming, thereby adjusting slurry viscosity to 4,000 mPa·s. By use of the viscosity-adjusted slurry material for formation, a sheet-like green body was formed on a PET film by a doctor blading process. The thickness of the sheet-like green body as measured after drying was 17 μm.

(3) Firing step: A 300 mm square piece was cut out from the sheet-like green body separated from the PET film by use of a cutter. The piece was crumpled and placed in a sheath (dimensions: 90 mm×90 mm×60 mm high) of alumina, followed by, in an uncovered condition (i.e., in the air), debindering at 600° C. for two hours and subsequent firing (thermal treatment) at a predetermined temperature (which will be described later) for 24 hours.

(4) Milling and classification step: The sheet-like body yielded by firing (thermal treatment) was placed on a polyester mesh having an average opening diameter of 20 μm and lightly pressed against the sieve mesh by use of a spatula for crushing and classification.

(5) Reheating step: Particles yielded by the above-mentioned milling and classification step were thermally treated at 650° C. in the atmosphere for 24 hours, thereby yielding plate-like secondary particles of spinel-type lithium manganate which contain crystal grains having a maximum diameter of 10 μm or more (the grain size can be confirmed through observation of grains by use of a scanning electron microscope).

2-2-2. Results of Evaluation

Table 4 shows the results of experiments in which the firing temperature was changed at a constant amount of addition of bismuth.

TABLE 4

| | Added amount of Bi [mol %] | Firing temp. [° C.] | Residual amount of Bi [mol %] | Capacity maintenance ratio [%] |
|---|---|---|---|---|
| Comparative Example 11 | 1 | 800 | 0.2 | 86 |
| Experimental Example 8 | 1 | 830 | less than 0.01 | 93 |
| Experimental Example 9 | 1 | 900 | less than 0.01 | 95 |
| Experimental Example 10 | 1 | 950 | less than 0.01 | 93 |
| Experimental Example 11 | 1 | 1,000 | less than 0.01 | 91 |
| Comparative Example 12 | 1 | 1,050 | less than 0.01 | 85 |

As shown in Table 4, when the firing temperature was in a range of 830° C. to 1,000° C., the capacity maintenance ratio was good (90% or higher). At this time, the residual amount of bismuth was 0.01 mol % or less with respect to manganese.

2-3. Collective Review of Evaluation Results

Figure 5:
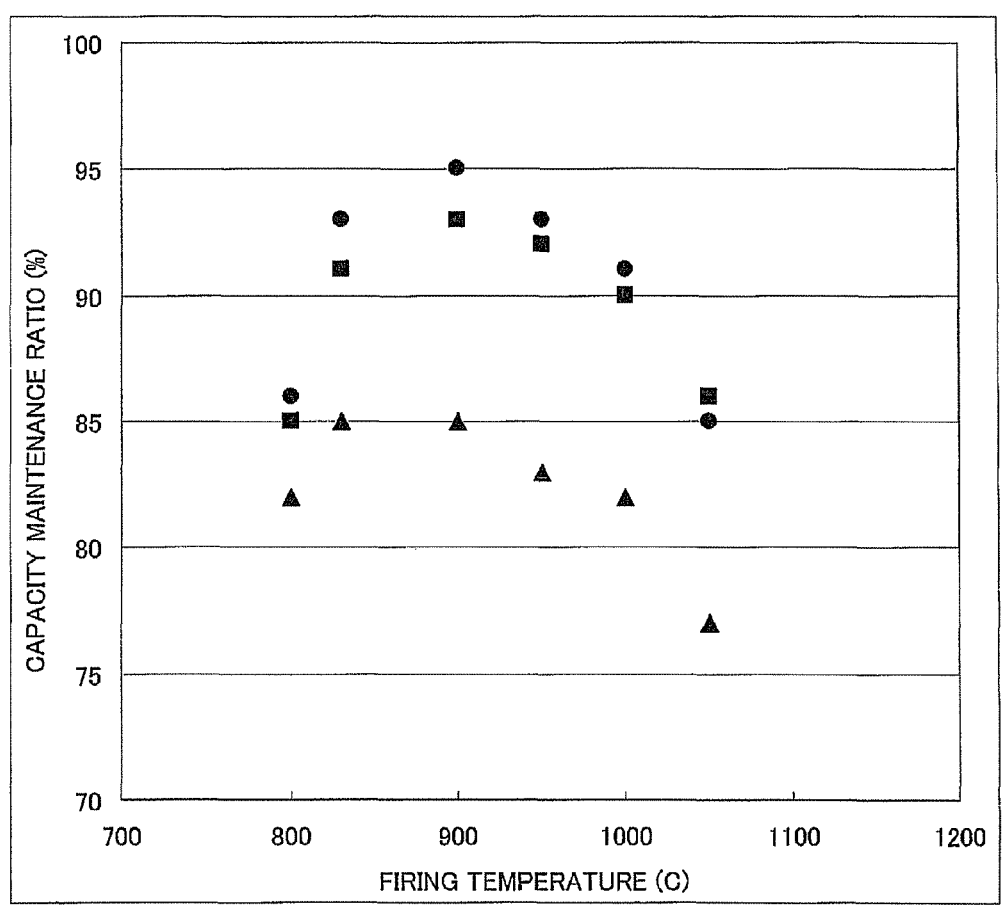
FIG. 5 is a graph collectively showing evaluation results appearing in Tables 1, 2, and 4.

FIG. 5 is a graph collectively showing the evaluation results appearing in Tables 1, 2, and 4. In FIG. 5, the results appearing in Table 1 are represented by square marks; the results appearing in Table 2 are represented by triangular marks; and the results appearing in Table 4 are represented by circular marks.

As is apparent from FIG. 5, the addition of bismuth has improved the capacity maintenance ratio. Also, when bismuth is added, and the firing temperature falls in a range of 830° C. to 1,000° C., the capacity maintenance ratio has become good (90% or higher).

Further, as is apparent from the results appearing in Tables 1, 3, and 4, by means of weighing materials in the material preparation step such that the resultant material mixture contains bismuth in an amount of 0.005 mol % to 2 mol % with respect to manganese, spinel-type lithium manganate having good characteristics has been yielded.

As in the case of Example 2 (see Table 4), by means of firing a sheet which is formed with its thickness controlled, grains can be grown up to the thickness of the sheet. According to this method, since the grain size is controlled by means of the sheet thickness, grains have uniform grain size. Also, since the grain surface is likely to be covered with the (111) plane, which is stable, durability is enhanced.

3. Modifications

The above-described embodiment and specific examples are, as mentioned above, mere examples of a best embodiment of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. Needless to say, even modifications are not limited to those described below. Limitingly construing the present invention based on the above-described embodiment and the following modifications impairs the interests of an applicant (particularly, an applicant who is motivated to file as quickly as possible under the first-to-file system) while unfairly benefiting imitators, and is thus impermissible.

The constitution of the above-described embodiment and the constitutions of the modifications to be described below are entirely or partially applicable in appropriate combination, so long as no technical inconsistencies are involved.

(1) The present invention is not limited to the constitution which is specifically disclosed in the description of the above embodiment. That is, the application of the present invention is not limited to the specific configurations shown in FIGS. 1, 2, and 4. Also, no particular limitation is imposed on the number of the cathode plates 2, the separators 4, and the anode plates 3 to be stacked together.

(2) The present invention is not limited to the manufacturing method disclosed specifically in the above-described embodiment. For example, the firing step may be performed by use of a rotary kiln. This removes bismuth more efficiently.

The bismuth compound is not limited to bismuth oxide ($Bi_2O_3$). For example, a compound of bismuth and manganese (e.g., $Bi_2Mn_4O_{10}$) can be used (even when bismuth oxide is used, $Bi_2Mn_4O_{10}$ is produced in the course of firing). In this case, during firing, bismuth transpires, and manganese becomes lithium manganate, thereby absorbing lithium excessively present in the form of solid solution. This yields spinel-type lithium manganate (cathode active material) having less impurities.

(3) Needless to say, those modifications which are not particularly referred to are also encompassed in the technical scope of the present invention, so long as the invention is not modified in essence.

Those components which partially constitute means for solving the problems to be solved by the present invention and are operationally or functionally expressed encompass not only the specific structures disclosed above in the description of the above embodiment and modifications but also any other structures that can implement the operations or functions of the components. Further, the contents (including specifications and drawings) of the prior application and publications cited herein can be incorporated herein as appropriate, by reference.

The invention claimed is

1. A method for manufacturing spinel-type lithium manganate comprising:
   a material preparation step of preparing a material containing lithium, manganese, and bismuth;
   a sheet formation step of forming the prepared material into one or more sheets;
   a firing step of firing the prepared material sheets at a temperature of 830° C. to 1,000° C.; and
   a step of placing the sheets individually on setters prior to the firing step to reduce overlap between adjacent sheets, whereby the transpiration of bismuth is accelerated due to contact between the atmosphere and the sheets during the firing step;
   wherein, in the material preparation step, the material is prepared such that the residual amount of bismuth in spinel-type lithium manganate yielded by the firing step is 0.01 mol % or less with respect to manganese.

2. A method for manufacturing spinel-type lithium manganate according to claim 1, wherein, in the material preparation step, the material is prepared such that the material contains bismuth in an amount of 0.005 mol % to 2 mol % with respect to manganese.

3. A method for manufacturing a cathode active material for a lithium secondary battery comprising:

a material preparation step of preparing a material containing lithium, manganese, and bismuth;

a sheet formation step of forming the prepared material into one or more sheets;

a firing step of firing the prepared material sheets at a temperature of 830° C. to 1,000° C. for yielding the cathode active material of spinel-type lithium manganate; and a step of placing the sheets individually on setters prior to the firing step to reduce overlap between adjacent sheets whereby the transpiration of bismuth is accelerated due to contact between the atmosphere and the sheets during the firing step;

wherein, in the material preparation step, the material is prepared such that the residual amount of bismuth in the cathode active material yielded by the firing step is 0.01 mol % or less with respect to manganese.

4. A method for manufacturing a cathode active material for a lithium secondary battery according to claim 3, wherein, in the material preparation step, the material is prepared such that the material contains bismuth in an amount of 0.005 mol % to 2 mol % with respect to manganese.

* * * * *